United States Patent
Kaufman (10) Patent No.: US 7,079,631 B1
(45) Date of Patent: Jul. 18, 2006

(54) LOCALIZED BROADCAST INFORMATION BASED ON CALL RELATED INFORMATION

(75) Inventor: Steven B. Kaufman, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/181,568

(22) Filed: Oct. 29, 1998

(51) Int. Cl.
*H04M 1/64* (2006.01)
*H04M 3/42* (2006.01)

(52) U.S. Cl. ..................... 379/88.2; 455/415
(58) Field of Classification Search ............. 379/88.19, 379/93.25, 67.1, 93, 40, 88.16, 88.23, 221.02, 379/93.07, 93.09, 93.12, 93.23, 142.08, 76, 379/88.21, 93.02, 93.03; 455/445, 414.3; 702/3; 705/14
See application file for complete search history.

(56) References Cited

U.S. PATENT DOCUMENTS

| | | | | |
|---|---|---|---|---|
| 4,757,267 A | * | 7/1988 | Riskin .................. | 379/88.19 |
| 5,390,237 A | * | 2/1995 | Hoffman et al. ......... | 379/88.23 |
| 5,459,779 A | * | 10/1995 | Backaus et al. ......... | 379/201 |
| 5,526,423 A | * | 6/1996 | Ohuchi et al. ............ | 379/67 |
| 5,568,385 A | * | 10/1996 | Shelton .................... | 364/420 |
| 5,608,788 A | * | 3/1997 | Demlow et al. .......... | 379/111 |
| 5,740,549 A | * | 4/1998 | Reilly et al. .............. | 705/14 |
| 5,848,378 A | * | 12/1998 | Shelton et al. ............ | 702/3 |
| 5,923,738 A | * | 7/1999 | Cardillo et al. ......... | 379/93.25 |
| 5,937,037 A | * | 8/1999 | Kamel et al. ........... | 379/88.19 |
| 5,963,626 A | * | 10/1999 | Nabkel .................... | 379/88.23 |
| 6,064,449 A | * | 5/2000 | White et al. ............ | 348/732 |
| 6,108,406 A | * | 8/2000 | Mitchell et al. ......... | 379/93.25 |
| 6,108,533 A | * | 8/2000 | Brohoff ................... | 455/414.3 |
| 6,195,426 B1 | * | 2/2001 | Bolduc et al. ........... | 379/88.22 |
| 6,301,480 B1 | * | 10/2001 | Kennedy et al. .......... | 455/445 |
| 6,442,244 B1 | * | 8/2002 | Fellingham et al. ..... | 379/93.12 |

* cited by examiner

*Primary Examiner*—Gerald Gauthier (57) ABSTRACT

A method and apparatus for accessing an one of a plurality of highly localized weather broadcasts based on the reception by a weather forecast service of call related information (e.g., Caller ID information) relating to an incoming call. A server associated with the weather service includes separate weather forecasts each based on call related information, e.g., an area code and/or exchange number. The highly localized weather forecast may be downloaded in analog or digital form, and may be played as received by a caller or stored for later playback. An off-line automatic dialer and record control module establishes a telephone call to a weather server at a predetermined time, e.g., just before sunrise, and automatically activates the downloading and storage of the weather forecast without further instruction required by the user. This allows the provision of a highly localized weather broadcast system which is capable of forecast resolution at least down to the locality of a particular exchange in a particular area code, while at the same time having the capability of being commonly located at a single telephone number. The highly localized weather forecasts may be accessed real-time for immediate audible play, or off-line by downloading a particularly chosen weather forecast while the customer premises equipment is off-line. The weather forecast may be downloaded in audible form and recorded at the customer premises equipment, or with the use of modems may be digitally downloaded to storage in the customer premises equipment for later playback.

25 Claims, 7 Drawing Sheets

| AREA CODE | EXCHANGE # | ASSOCIATED WEATHER FORECAST | |
|---|---|---|---|
| (800) | 555 | LOCATION #62 | —281 |
| (800) | 666 | LOCATION #66 | —282 |
| (888) | 555 | LOCATION #74 | —283 |
| ⋮ ETC. ⋮ | ⋮ ETC. ⋮ | ⋮ ETC. ⋮ | |

LOCALIZED BROADCAST INFORMATION BASED ON CALL RELATED INFORMATION

BACKGROUND OF THE INVENTION

1. Field of the Invention

This invention relates generally to an apparatus and method for accessing highly localized weather broadcasts by a calling party on a telephone line. More particularly, it relates to an apparatus and method for accessing localized weather broadcasts pertinent to the caller based on call related information, e.g., Caller ID information relating to the calling party.

2. Background of Related Art

In many communities, people can access an audibly-played weather broadcast on their telephone by dialing a specific telephone number. Typically, every community has a specific weather broadcast telephone number which must be dialed to access the localized weather broadcast. Depending on which localized weather broadcast the calling party desires to access, the calling party must know the specific weather broadcast telephone number for the desired particular localized area prior to actually dialing the telephone number. Typically, to reduce long distance charges and/or to encourage use, localized weather broadcasts are located close to the calling area of the users. However, this tends to significantly increase costs associated with such a weather service, and also tends to enlarge the regions specifically covered by any one weather forecast.

Figure 7:
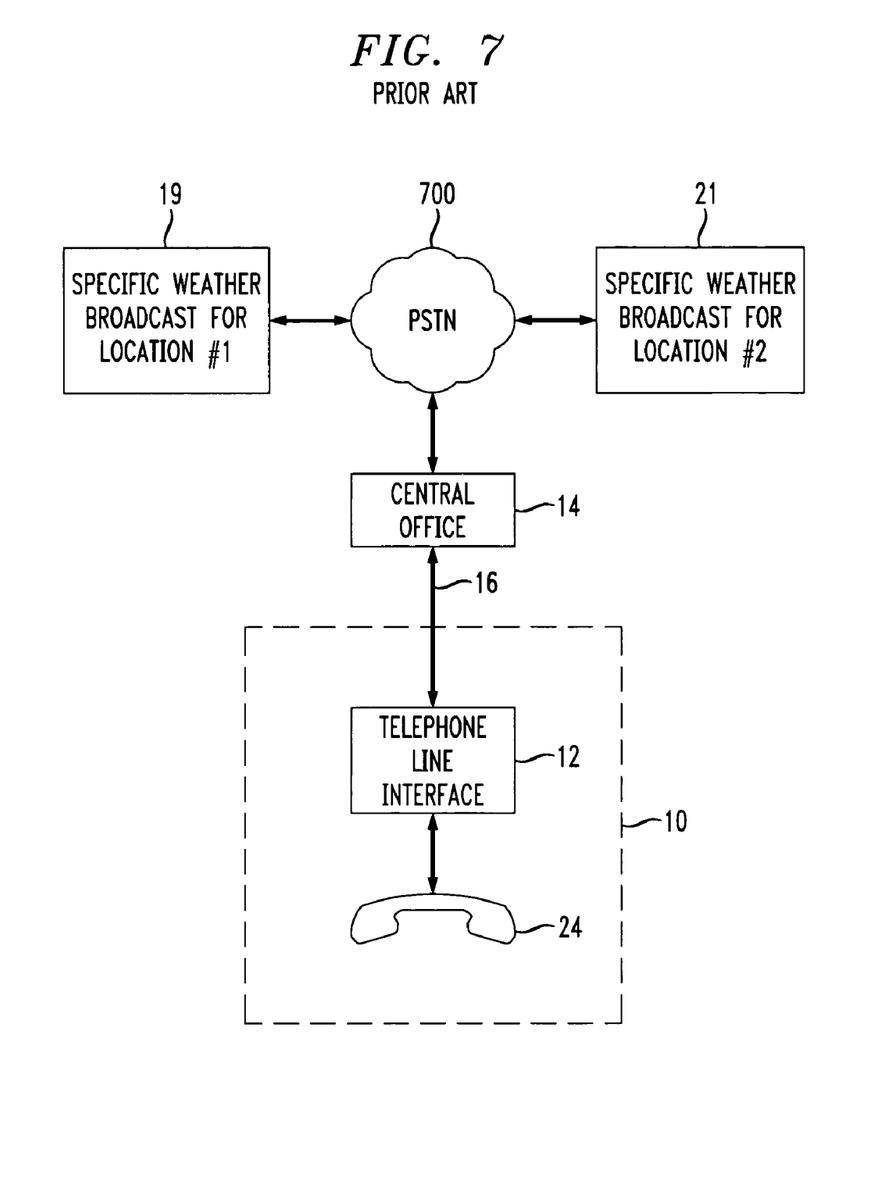
FIG. 7 illustrates a conventional telephone system utilized to establish a telephone call with any appropriate one of a plurality of separate audible recordings regarding generalized weather forecasts for large regions.

FIG. 7 illustrates a conventional telephone system capable of accessing an audibly-played localized weather broadcast.

In FIG. 7, a telephone 10 is connected to a telephone company central office 14 via a telephone line 16. A telephone line interface (TLI) 12 in the telephone 10 provides the conventional isolation, DC and AC impedance as required by telephone company standards. The telephone line interface 12 is connected to a handset 24 which the user utilizes to listen to the desired weather forecast based on the particular dialed telephone number.

To access and receive an audibly-played specific weather broadcast for a first location, the user dials a specific telephone number for that desired community, which is typically established as a local call to the user. Upon dialing of the specific telephone number, the telephone 10 is connected by an established telephone call to the audibly played weather broadcast specifically assigned to that region or location. Once connected, the specific weather broadcast for the called location 19 is then audibly played for the user.

If the user wants to access and receive an audibly-played specific weather broadcast for a second location, or if a weather service desires to support additional communities, additional telephone numbers or mailboxes must be established for each separate weather forecast. Thus, users in the other locations, or those desiring weather information for a second location, must call a different telephone number or mailbox to access a weather forecast specific to a second location 21.

Thus, upon dialing of a specific telephone number, the telephone 10 may be connected through the telephone line 16 to the central office 14 and to the desired weather broadcast 19 or 21, to gain access to the audibly played weather forecast for the user.

Accordingly, there exists a need for an apparatus and method which allows a user to access weather forecasts which are more highly focused on the particular area from which the caller is calling, without increasing costs over conventional techniques.

SUMMARY OF THE INVENTION

In accordance with the principles of the present invention, a server is adapted to provide highly localized broadcast information to a plurality of localities. The server comprises a processor, a call related information/broadcast information stream lookup table accessible by the processor and associating call related information entries with respective broadcast information streams, and a plurality of stored broadcast information streams. The processor is adapted to identify a specific one of the plurality of stored broadcast information streams for downloading to a caller based on call related information received with respect to an incoming call.

A customer premises equipment for receiving a highly localized broadcast information stream in accordance with another aspect of the present invention comprises a telephone line interface. A voice recorder/playback module is adapted to store a broadcast information stream downloaded through a telephone switching system. The broadcast information stream is selected based on call related information received with respect to a call from the customer premises equipment. Broadcast information memory is adapted to store the broadcast information stream. A dialer and record module is adapted to dial a telephone number of a source of the broadcast information stream, and to facilitate storage of the broadcast information stream in the broadcast information memory.

A method of selecting a highly localized broadcast information stream in accordance with yet another aspect of the present invention comprises receiving call related information relating to a calling party. A desired one of a plurality of broadcast information streams is determined for downloading to the calling party based on the call related information. The desired one of the plurality of broadcast information streams is downloaded to the calling party.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a method and apparatus for accessing a highly localized weather broadcast selected based on the reception by a weather forecast service of call related information (e.g., Caller ID information) relating to an incoming call. The appropriate, highly localized forecast is downloaded to the caller based on, e.g., the area code and/or exchange number of the caller. This allows the provision of a highly localized weather broadcast system which is capable of invisibly selecting and downloading a highly specific weather forecast to a resolution at least down to the locality of a particular exchange in a particular area code.

While potentially requiring the maintenance and updating of a large number of weather forecasts, increased hardware and system costs are minimal particularly because the weather forecasts for all locations can be co-located and all accessed via a common telephone number. Thus, a calling party need only dial one telephone number from any location, yet receive a highly customized weather forecast particular to the region in which the area code (and exchange) of the caller are located.

The highly localized weather forecasts may be accessed real-time or off-line. In particular, real-time access to the highly localized weather forecasts may be obtained for immediate, audible play based on call related information (e.g., Caller ID information) by simply dialing a predetermined access telephone number. To further increase usage of the weather service from a large area, even though the weather forecasts are accessed from a common location, a toll-free telephone number may be established for the common telephone number.

Alternatively, or additionally, the weather forecasts may be obtained by customer premises equipment having message storage capability, e.g., a voice messaging system, by downloading the highly localized weather forecast during off periods of the customer premises equipment, e.g., in the middle of the night, for later playback by the user, e.g., first thing in the morning. This would provide immediate weather information to the user which is highly particular to the location of the user's household or business.

The downloaded, highly localized weather forecast may be downloaded using analog techniques wherein the customer premises equipment either plays the weather forecast as it is received, or digitizes and stores the downloaded weather forecast. Alternatively, using a modem both at the customer premises equipment and at the called weather service, the highly localized weather forecast may be downloaded digitally from a server at the weather service and stored for later playback at the user's voice messaging system. In either case, in accordance with the principles of the present invention, the digitally downloaded weather forecast will be highly localized by association with information (e.g., an area code and/or exchange number) contained in the call related information received by the weather service relating to the incoming call.

Figure 1:
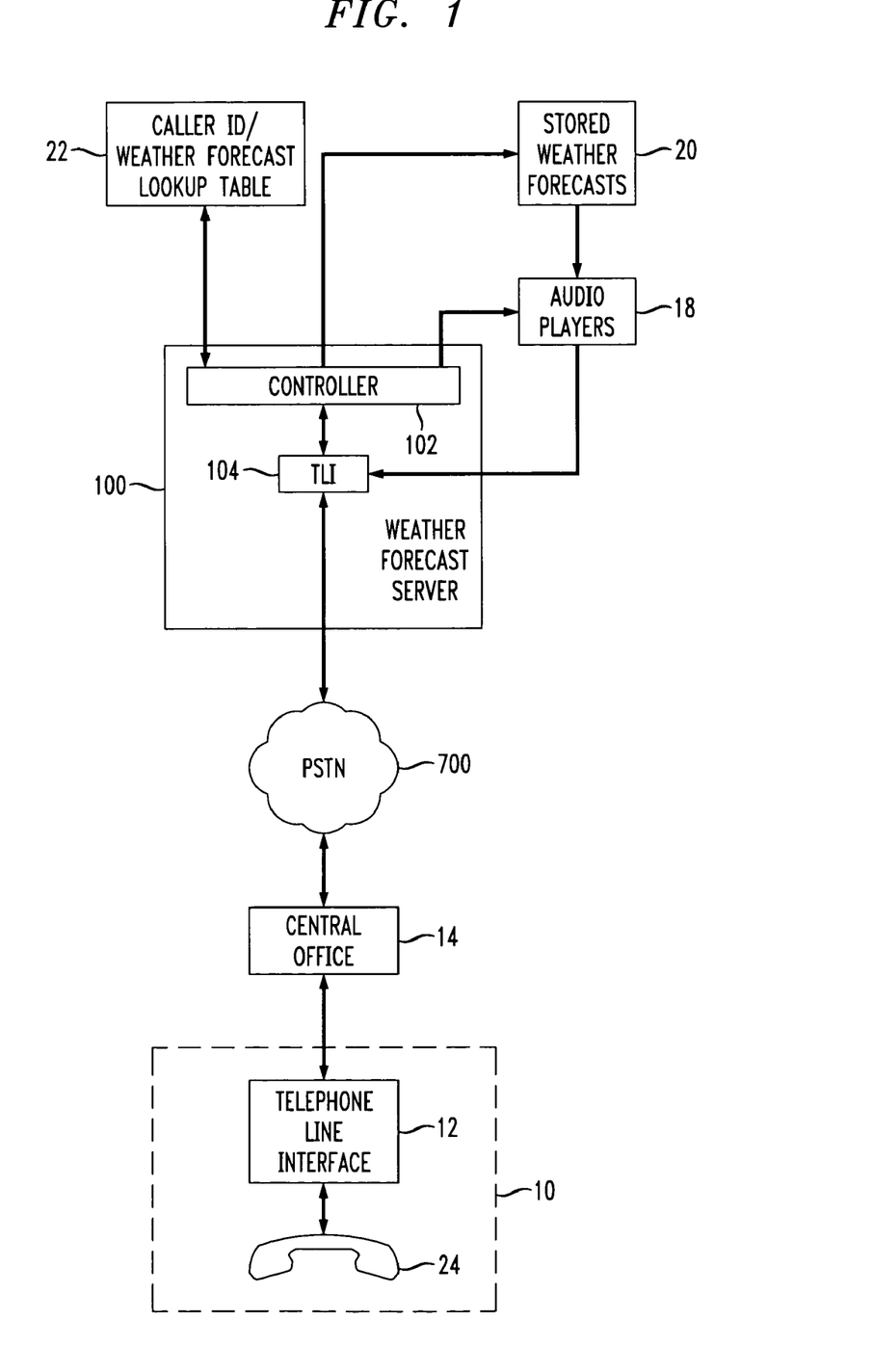
FIG. 1 is a block diagram illustrating an apparatus capable of audibly receiving a highly specific audibly-played weather broadcast determined from a comparison of call related information received with respect to the caller to a look-up table which associates the call related information (e.g., Caller ID information) with a designated weather forecast for that calling area, in accordance with the principles of the present invention.

FIG. 1 is a block diagram illustrating an apparatus capable of audibly receiving a highly specific audibly-played weather broadcast determined from a comparison of call related information received with respect to the caller to a look-up table which associates the call related information (e.g., Caller ID information) with a designated weather forecast for that calling area, in accordance with the principles of the present invention.

In particular, a common telephone 10 or other customer premises equipment including a telephone line interface 12 and a handset or other communication device (e.g., speaker and microphone) dials a particular telephone number of a weather forecast server 100. A central office 14 routes the call from the telephone 10 through the public switched telephone network (PSTN) 700 to the weather forecast server 100.

The weather forecast server 100 in the disclosed embodiment includes an appropriate telephone line interface 104 for receiving the in-band telephone call from the central office 14. Of course, the principles of the present invention relate equally to out-of-band signaling or communication between the central office 14 and the weather forecast server 100.

In the disclosed embodiments, it is presumed that the weather forecast server 100 receives call related information, e.g., Caller ID information such as a telephone number of a calling party, with incoming calls.

The weather forecast service further includes a call related information (e.g., Caller ID)/weather forecast lookup table 22, a plurality of stored weather forecasts 20, and an audio player 18.

Figure 2:
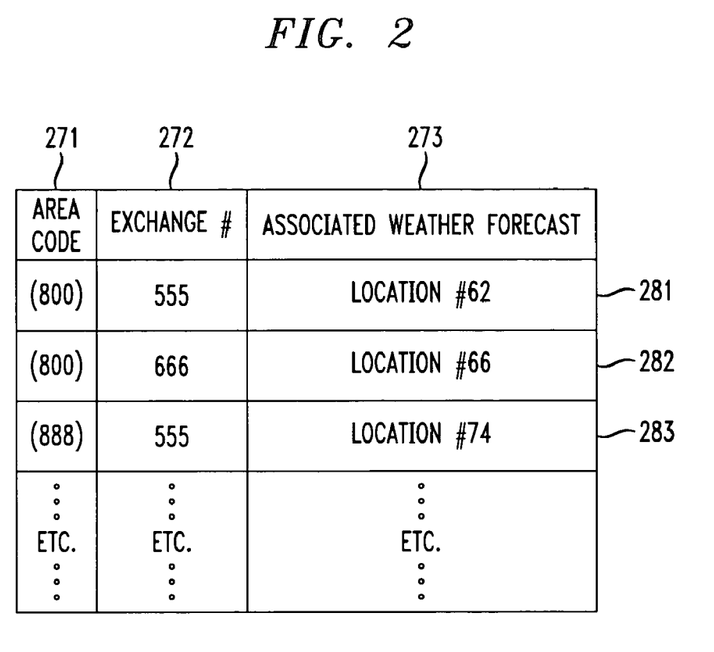
FIG. 2 is a table illustrating exemplary contents of a call related information/weather forecast look-up table, e.g., as shown in FIG. 1.

The Caller ID/weather forecast lookup table 22 includes at least one entry associating a particular portion of a telephone number, e.g., an area code and/or an exchange number, to a particular updated weather forecast stored in the stored weather forecasts storage element 20. For instance, FIG. 2 depicts the contents of three exemplary entries 281–283 stored in the Caller ID/weather forecast lookup table or database 22 shown in FIG. 1.

Each entry 281–283 includes an association of an area code 271 and an exchange number 272 to an appropriately indexed current weather forecast 273 for that particular calling area. The appropriately indexed current weather forecasts 273 are stored in the stored weather forecast storage element 20.

Preferably, the stored weather forecast storage element 20 is non-volatile memory, but can be volatile memory within the principles of the present invention. Moreover, while the present invention is disclosed with respect to highly localized weather forecasts stored digitally in an appropriate stored weather forecast storage element 20, the principles of the present invention relate equally to the analog storage (e.g., repeating cassette tape or similar device) of the highly localized weather forecasts.

Referring back to FIG. 1, in response to a telephone call from a caller, the controller 102 compares received call related information (e.g., an area code and/or an exchange number) with each of the entries 281–283 in the Caller ID/weather forecast lookup table 22 (FIG. 1). If a match is made, the controller 102 obtains the appropriately indexed highly localized weather forecast from the stored weather forecasts storage device 20 if digitally stored, or triggers an analog playback of an analog stored weather forecast from the stored weather forecasts storage element 20. In either case, an audio player 18 performs a digital to analog conversion in the case of digitally stored weather forecasts, and inserts the audibly-played weather forecast into the telephone line interface 104 so that the caller at the telephone 10 will hear the same.

Accordingly, a caller from any location within a large expanse, e.g., from anywhere in the country, can call a common telephone number (e.g., a toll-free telephone number) and receive a highly localized and specific weather forecast determined based on call related information (e.g., an area code and/or exchange number) of the caller's telephone. The comparison of call related information to available weather forecasts by the weather forecast server 100 is preferably performed invisibly to the caller, providing the automatic convenience of a very specific weather forecast from any area in the country simply by dialing a telephone number.

Figure 3:
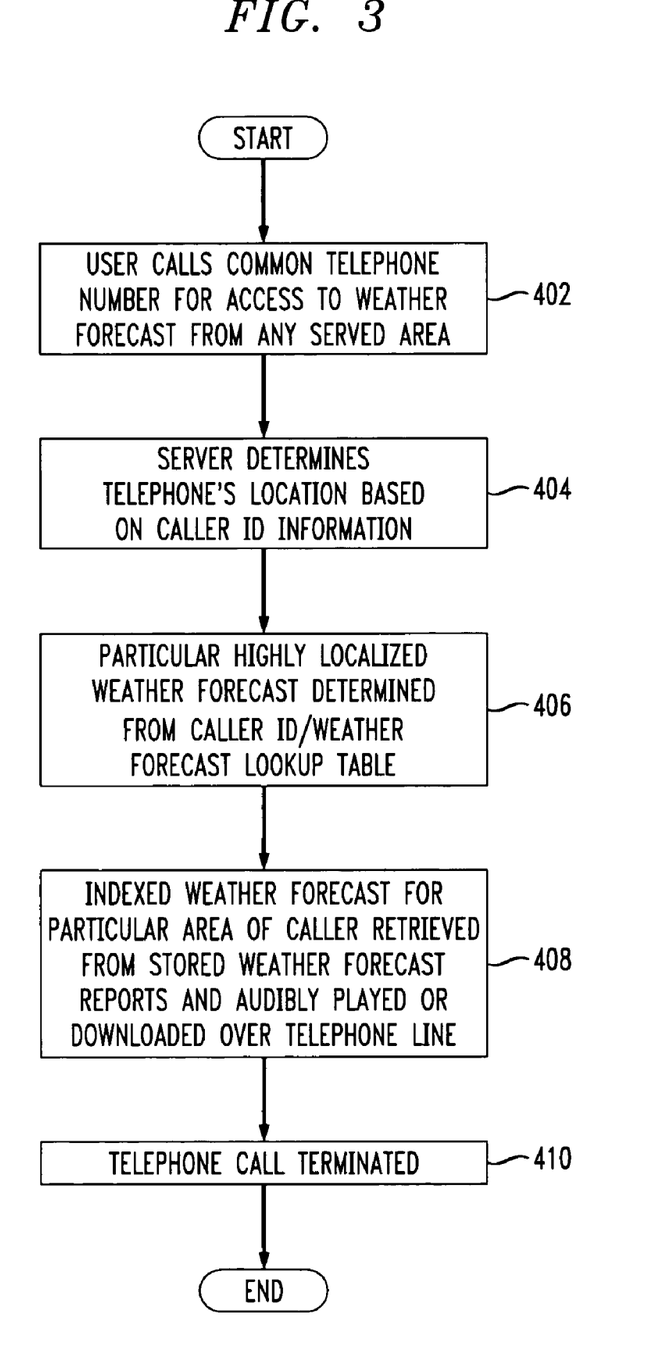
FIG. 3 is a flow chart illustrating an exemplary process by which a user accesses the call related information/weather forecast look-up table and receives a highly localized and specific weather forecast over the telephone line, in accordance with the principles of the present invention.

FIG. 3 is a flow chart illustrating an exemplary process by which a user accesses the call related information/weather forecast look-up table and receives a highly localized and specific weather forecast over the telephone line, in accordance with the principles of the present invention.

In particular, in step 402, a calling party desiring a weather forecast for their particular calling area (with a resolution as small as an area serviced by one exchange number within one area code) calls a common telephone number from wherever they are in the serviced region.

In step 404, the weather forecast server 100 determines the calling party's telephone's location based on call related information received from the central office 14, e.g., the area code and exchange number of the calling party.

In step 406, the index of a particular highly localized weather forecast is determined by the controller 102 (FIG. 1) from a comparison of the received call related information to each of the entries in the Caller ID/weather forecast lookup table 22 until a match is found.

In step 408, the matched highly localized weather forecast for the particular calling area of the calling party is retrieved from the stored weather forecast storage device 20 and audibly played over the telephone line.

In step 410, the telephone call is terminated, either by the weather forecast server 100, the calling telephone 10, and/or the central office 14.

Figure 4:
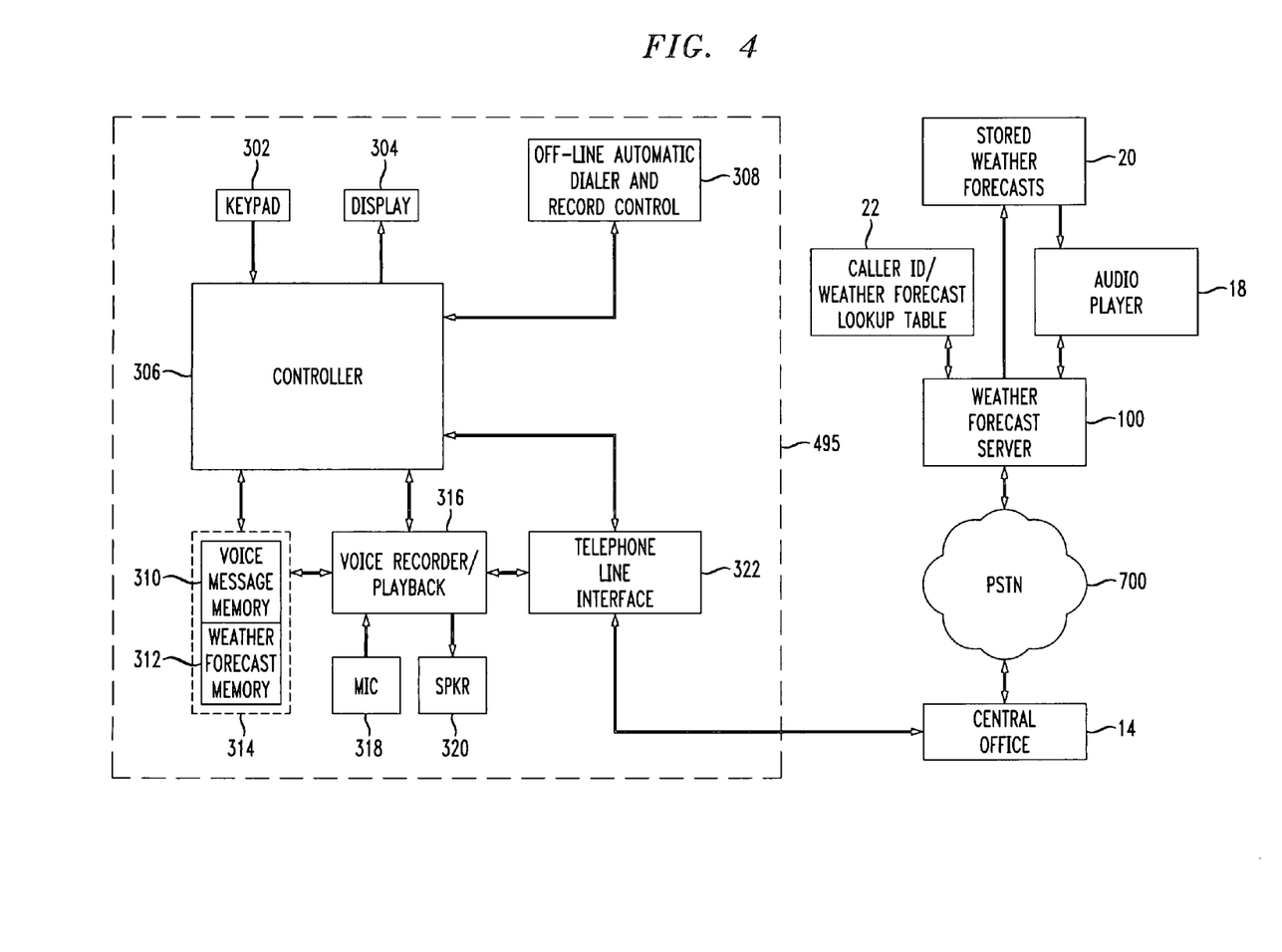
FIG. 4 is a block diagram illustrating another embodiment of the present invention capable of audibly receiving a download of a highly localized weather forecast for later playback based on a lookup of call related information received by the weather forecast service with respect to the calling party.

FIG. 4 is a block diagram illustrating another embodiment of the present invention capable of audibly receiving a download of a highly localized weather forecast for later playback based on a lookup of call related information received by the weather forecast service with respect to the calling party.

In particular, the customer premises equipment 495 comprises a voice messaging system, e.g., a telephone answering device. The telephone answering device 495 includes a controller 306, an alphanumeric keypad 302, and a display 304.

The controller 306 controls the overall functionality of the telephone answering device 495, and may be any suitable processor, e.g., microprocessor, microcontroller, or digital signal processor (DSP). The alphanumeric keypad 302 allows a user to dial a telephone number, and a display 304 is utilized to provide the user with conventional answering machine information, e.g., the number of messages stored, etc.

The telephone answering device 495 also includes an appropriate telephone line interface 322 to provide the conventional DC and AC impedance to the central office 14.

A voice recorder/playback module 316, microphone 318, speaker 320, and message storage memory 314 provide otherwise conventional voice messaging recording and playback functions.

In accordance with the principles of the present invention, the telephone answering device 495 further includes an off-line automatic telephone number dialer and record control module 308. Its function is to automatically dial the common telephone number for accessing the weather forecast server 100 (preferably when the telephone answering device 495 is off-line, such as in the middle of the night, or just before sunrise). The off-line automatic telephone number dialer and record control module 308 is preferably located within the program code of the controller 306, but may be external to the controller 306, in accordance with the principles of the present invention.

When a downloaded signal, e.g., an analog audio signal is detected being played over the telephone line from the weather forecast server 100, the off-line automatic dialer and record control module 308 will activate the voice recorder/playback module 316 to record the audibly downloaded weather forecast. Preferably, the audibly downloaded and locally recorded weather forecast will be stored in a portion of the voice message memory 314, e.g., in a weather forecast memory portion 312. Preferably, the voice message memory 314 is non-volatile memory, e.g., Flash memory.

Upon detection of the termination of the telephone call, the voice recorder/playback module 316 will terminate the recordal and storage of the weather forecast.

At any time after the highly localized weather forecast is stored in the weather forecast memory 312, the user can listen to the weather forecast by appropriately instructing the telephone answering device 495, e.g., by depressing a dedicated button (not shown).

Thus, as shown in FIG. 4, a highly localized weather forecast can be downloaded in audible, analog form, and either played as it is received, or can be digitized and stored for later playback. However, the present invention also applies to the digital downloading of the weather forecast information, for storage and/or playback at a user's voice messaging system.

Figure 5:
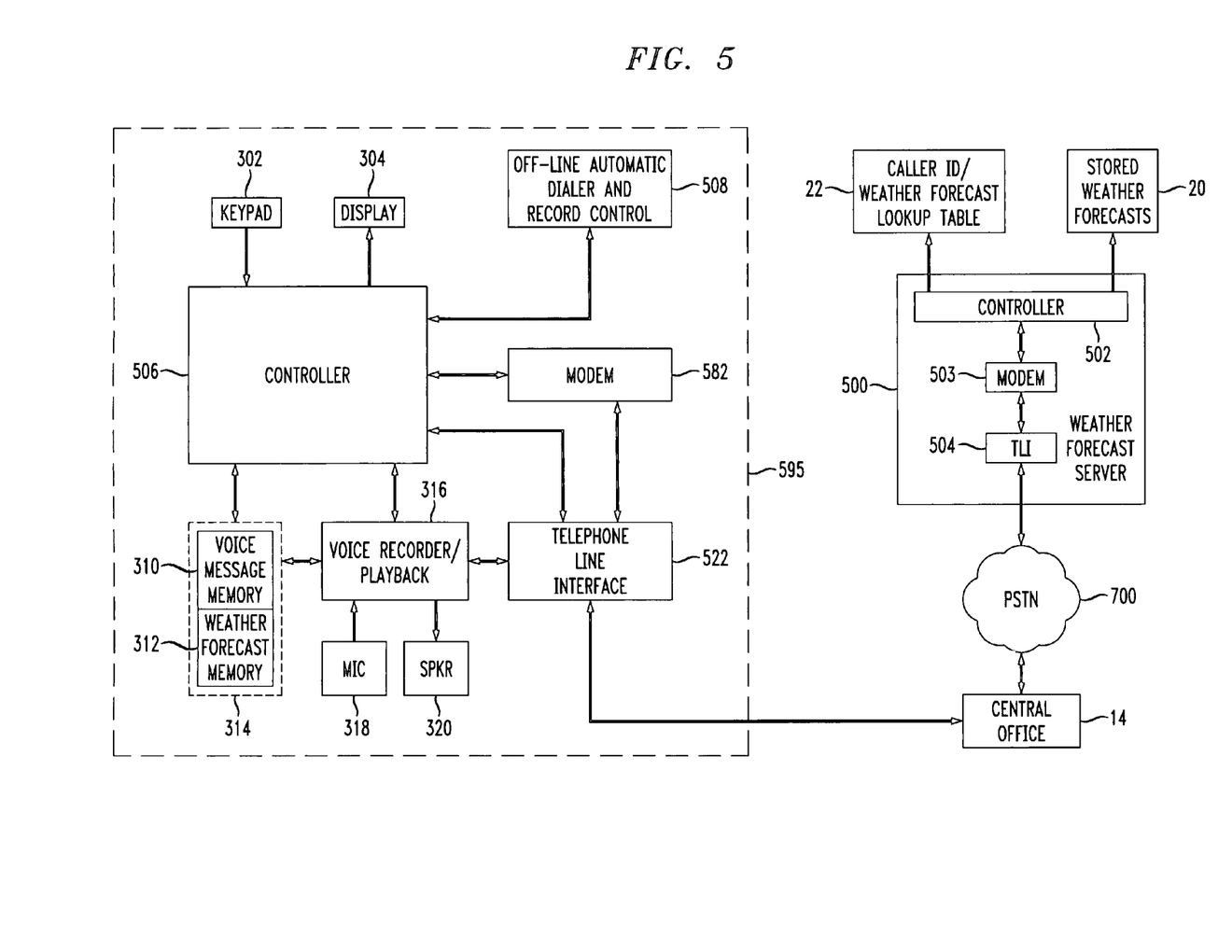
FIG. 5 is a block diagram illustrating yet another embodiment of the present invention capable of digitally downloading a highly localized weather forecast for later playback based on a lookup of call related information received by the weather forecast service with respect to the calling party.

For instance, FIG. 5 is a block diagram illustrating yet another embodiment of the present invention capable of digitally downloading a highly localized weather forecast for later playback based on a lookup of call related information received by the weather forecast service with respect to the calling party.

In particular, a modem 582 is added to the telephone answering device otherwise shown in FIG. 4, and a modem 503 is added to the weather forecast server 500, to allow digital communication over a telephone line to the central office 14. Moreover, at the weather service, an audio player is not necessary for digital downloading of the appropriate, highly localized weather forecast. Thus, when an appropriate, highly localized weather forecast is retrieved from the stored weather forecast storage device 20 by the controller 502 of the weather forecast server 500, the digital information can be directed to be stored in the weather forecast memory 312 of the telephone answering device 595 shown in FIG. 5 for later playback by the user.

Figure 6:
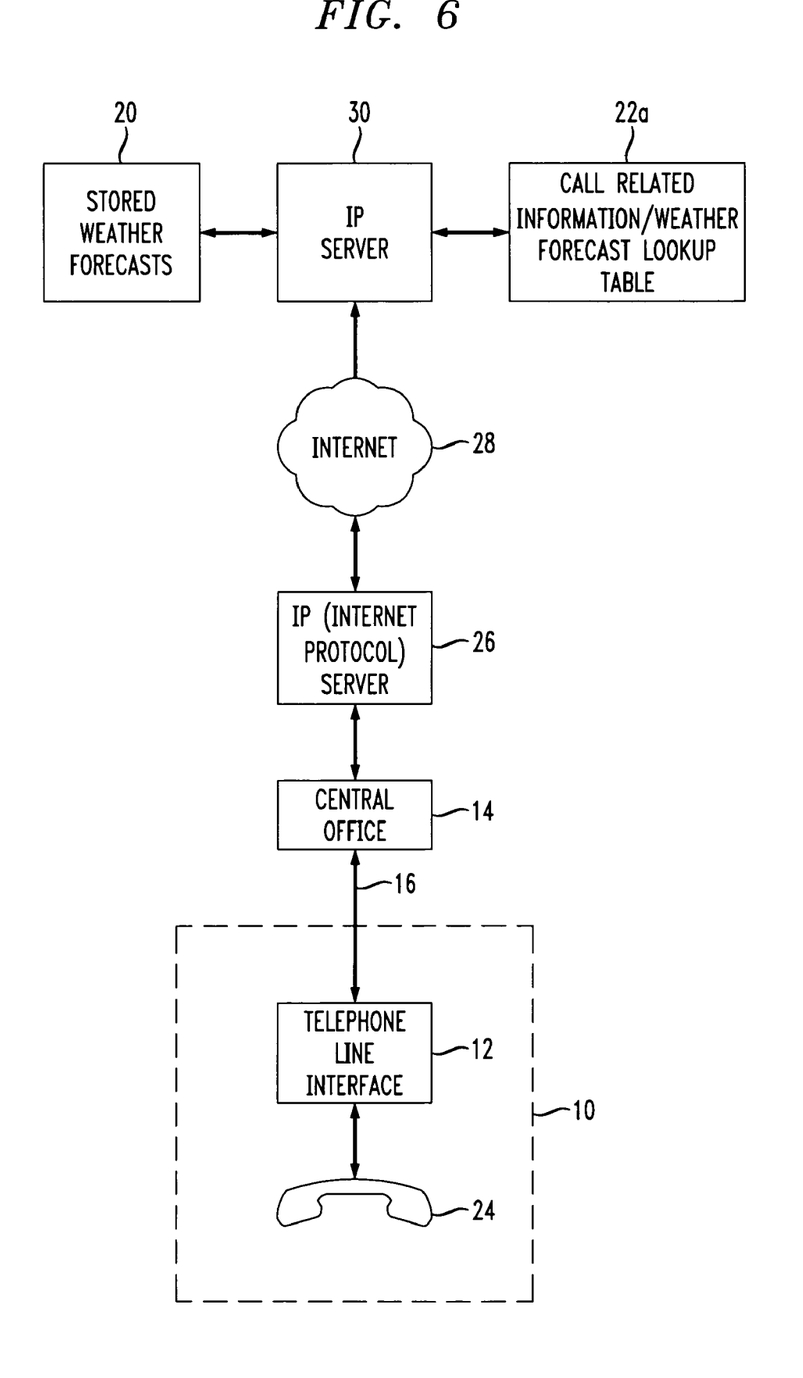
FIG. 6 is a block diagram illustrating communication using the Internet for digitally downloading a highly localized weather forecast from an appropriate IP server based on call related information packetized by the central office and transmitted to the IP server of the weather service, in accordance with the principles of the present invention.

FIG. 6 is a block diagram illustrating that the highly localized weather forecasts need not be limited to communication over the PSTN only. For instance, the weather forecasts can be downloaded over the Internet as shown in FIG. 6.

In this case, the weather forecast server 30 is an Internet Protocol (IP) server 30 which is in communication with the stored weather forecast storage device 20 and a call related information/weather forecast lookup table 22*a*. The central office 14 communicates with the Internet 28 via its own IP server 26.

The call related information, while being an area code and exchange number in the disclosed embodiment, need not be, particularly when the call related information is digitally transmitted out of band as in the case of the Internet.

Thus, in accordance with the principles of the present invention, a calling party is provided with invisible, automatic access to a highly localized and specific weather forecast simply by dialing a common telephone number from anywhere over a large region, and potentially from anywhere in the country.

The present invention, although described with respect to weather forecast information, is applicable to the dissemination of any information which is calling area specific or calling party specific and available by calling a common telephone number.

While the invention has been described with reference to the exemplary embodiments thereof, those skilled in the art will be able to make various modifications to the described embodiments of the invention without departing from the true spirit and scope of the invention.

What is claimed is:

1. A server adapted to provide highly localized broadcast information relevant to a plurality of localities, said server comprising:
    a processor within said server;
    a caller information and pre-stored broadcast information stream relevant to a locality lookup table within said server accessible by said processor and associating caller information entries with respective pre-stored broadcast information streams relevant to a locality;
    a plurality of pre-stored broadcast information streams within said server of current news relevant to a locality;
    wherein said processor is adapted to automatically identify a specific one of said plurality of pre-stored broadcast information streams based only on caller information received with respect to an incoming call, and to allow downloading to a caller of a real time audible representation of said one of said plurality of pre-stored broadcast information streams relevant to said locality.

2. The server adapted to provide highly localized broadcast information to a plurality of localities according to claim 1, further comprising:
    a telephone line interface in communication with said processor.

3. The server adapted to provide highly localized broadcast information to a plurality of localities according to claim 1, further comprising:
    a modem in communication with said processor.

4. The server adapted to provide highly localized broadcast information to a plurality of localities according to claim 2, further comprising:
    an audio player adapted to play said specific one of said plurality of pre-stored broadcast information streams through said telephone line interface.

5. The server adapted to provide highly localized broadcast information to a plurality of localities according to claim 1, wherein:
    said caller information is at least a portion of a telephone number.

6. The server adapted to provide highly localized broadcast information to a plurality of localities according to claim 5, wherein:
    said portion of said telephone number includes an area code.

7. The server adapted to provide highly localized broadcast information to a plurality of localities according to claim 5, wherein:
    said portion of said telephone number includes an exchange number.

8. The server adapted to provide highly localized broadcast information to a plurality of localities according to claim 5, wherein:
    said portion of said telephone number includes an area code and an exchange number.

9. The server adapted to provide highly localized broadcast information to a plurality of localities according to claim 1, wherein:
    said current news is weather forecast information.

10. The server adapted to provide highly localized broadcast information to a plurality of localities according to claim 1, wherein:
    said broadcast information is weather forecast information.

11. A method of selecting a pre-stored broadcast information stream relevant to a locality, comprising:
    receiving caller information relating to a calling party by a server;
    automatically determining, by a server, a desired one of a plurality of pre-stored broadcast information streams of current news relevant to a locality based only on said caller information; and
    downloading a real-time audible representation of said desired one of said plurality of pre-stored broadcast information streams relevant to a locality to said calling party.

12. The method of selecting a highly localized broadcast information stream according to claim 11, wherein:
    said steps of receiving, determining, and downloading are performed without intervention by a user.

13. The method of selecting a highly localized broadcast information stream according to claim 11, wherein:
    said caller information includes an area code.

14. The method of selecting a highly localized broadcast information stream according to claim 11, wherein:
    said caller information includes an exchange number.

15. The method of selecting a highly localized broadcast information stream according to claim 11, wherein:
    said caller information is Caller ID information.

16. The method of selecting a highly localized broadcast information stream according to claim 11, wherein:
    said caller information includes an area code and an exchange number.

17. The method of selecting a highly localized broadcast information stream according to claim 11, wherein:
    said step of determining is performed using a look up table.

18. The method of selecting a highly localized broadcast information stream according to claim 11, wherein said downloading comprises:
    audibly playing said desired one of said plurality of pre-stored broadcast information streams.

19. The method of selecting a highly localized broadcast information stream according to claim 11, wherein said downloading comprises:
    digitally transmitting over a telephone line said desired one of said plurality of pre-stored broadcast information streams.

20. The method of selecting a highly localized broadcast information stream according to claim 11, further comprising:
   storing said downloaded desired one of said plurality of pre-stored broadcast information streams in a voice messaging system associated with said calling party.

21. The method of selecting a highly localized broadcast information stream according to claim 11, wherein:
   said current news includes weather forecast information.

22. The method of selecting a highly localized broadcast information stream according to claim 11, wherein:
   said broadcast information stream includes weather forecast information.

23. Apparatus for selecting a highly localized pre-stored broadcast information stream, comprising:
   means for receiving caller information relating to a calling party by a server;
   means for automatically determining, by a server, a desired one of a plurality of pre-stored broadcast information streams relevant to a locality based only on said caller information; and
   means for downloading said desired one of said plurality of pre-stored broadcast information streams relevant to a locality to said calling party.

24. The apparatus for selecting a highly localized broadcast information stream according to claim 23, wherein:
   said current news includes weather forecast information.

25. The apparatus for selecting a highly localized broadcast information stream according to claim 23, wherein:
   said broadcast information stream includes weather forecast information.

* * * * *